US010708558B2

(12) United States Patent
Sato

(10) Patent No.: US 10,708,558 B2
(45) Date of Patent: Jul. 7, 2020

(54) LIGHTING APPARATUS AND PROJECTOR

(71) Applicant: SONY CORPORATION, Tokyo (JP)

(72) Inventor: Yoshihisa Sato, Saitama (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/489,638

(22) PCT Filed: Feb. 20, 2018

(86) PCT No.: PCT/JP2018/005861
§ 371 (c)(1),
(2) Date: Aug. 28, 2019

(87) PCT Pub. No.: WO2018/179996
PCT Pub. Date: Oct. 4, 2018

(65) Prior Publication Data
US 2020/0014890 A1 Jan. 9, 2020

(30) Foreign Application Priority Data
Mar. 31, 2017 (JP) ................. 2017-070193

(51) Int. Cl.
H04N 9/31 (2006.01)
G09G 3/36 (2006.01)
(52) U.S. Cl.
CPC ............ H04N 9/315 (2013.01); G09G 3/36 (2013.01); H04N 9/31 (2013.01)
(58) Field of Classification Search
CPC ................. H04N 9/315; G09G 3/36
(Continued)

(56) References Cited

U.S. PATENT DOCUMENTS 4,389,096 A * 6/1983 Hori ................ G02F 1/1335
348/766
5,708,488 A * 1/1998 Fukui ................ G02B 27/46
349/76

(Continued)

FOREIGN PATENT DOCUMENTS

CN 1664906 A 9/2005
JP 2005-202377 A 7/2005

(Continued)

OTHER PUBLICATIONS

International Search Report and Written Opinion of PCT Application No. PCT/JP2018/005861, dated May 29, 2018, 08 pages of ISRWO.

Primary Examiner — Michael Lee
(74) Attorney, Agent, or Firm — Chip Law Group

(57) ABSTRACT

A lighting apparatus according to the disclosure includes: a light source; a phase modulation liquid crystal panel that includes a plurality of pixels, the phase modulation liquid crystal panel modulating a phase of light from the light source for each of the pixels; a modulation signal corrector that performs signal correction that corrects a pixel modulation signal for a target pixel among the plurality of pixels on the basis of a pixel modulation signal for at least one peripheral pixel that is located around the target pixel to reduce a deviation amount relative to a desired amount of modulation for the target pixel; and an application voltage generator that generates an application voltage to be applied to each of the pixels on the basis of the pixel modulation signal having been corrected by the modulation signal corrector.

9 Claims, 14 Drawing Sheets

(58) Field of Classification Search
 USPC .......................................................... 348/744
 See application file for complete search history.

(56) References Cited

U.S. PATENT DOCUMENTS

| | | | |
|---|---|---|---|
| 6,560,018 B1 * | 5/2003 | Swanson | G02B 5/02 |
| | | | 257/E21.011 |
| 2005/0168424 A1 | 8/2005 | Nakamoto et al. | |
| 2006/0227283 A1 * | 10/2006 | Ooi | G02F 1/13306 |
| | | | 349/201 |
| 2008/0181084 A1 * | 7/2008 | Sasabe | G02F 1/133504 |
| | | | 369/112.02 |
| 2010/0008070 A1 * | 1/2010 | Lee | G02B 6/0031 |
| | | | 362/97.2 |
| 2015/0085197 A1 | 3/2015 | Yoshida | |
| 2017/0315422 A1 * | 11/2017 | Sakurai | G02F 1/13306 |

FOREIGN PATENT DOCUMENTS

| | | |
|---|---|---|
| JP | 2014-089274 A | 5/2014 |
| JP | 2015-065391 A | 4/2015 |
| JP | 2016-143037 A | 8/2016 |
| KR | 10-2005-0061362 A | 6/2005 |
| TW | 200601222 A | 1/2006 |
| WO | 2017/013862 A1 | 1/2017 |

\* cited by examiner

[ FIG. 1 ]
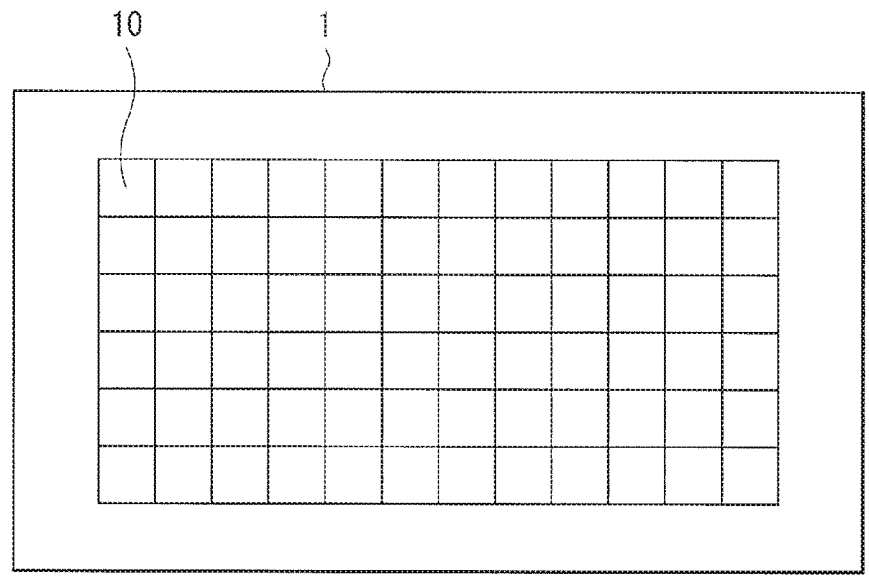
[ FIG. 2 ]
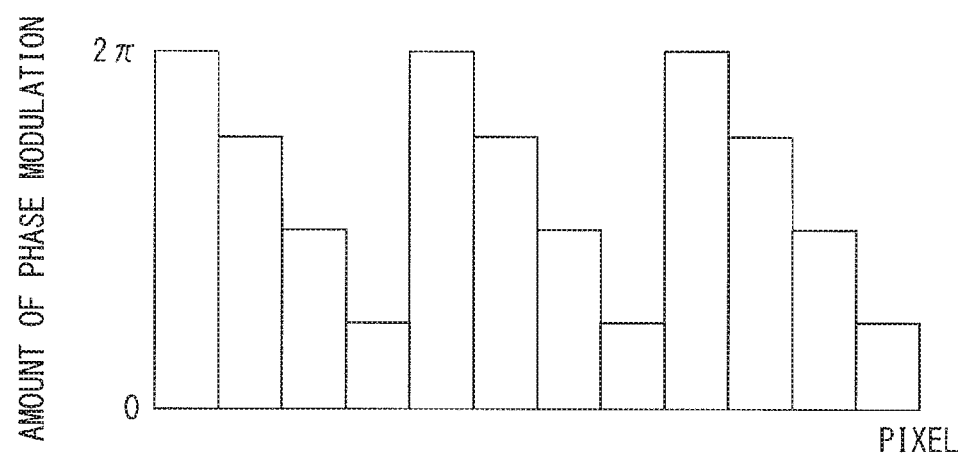

[FIG. 3]
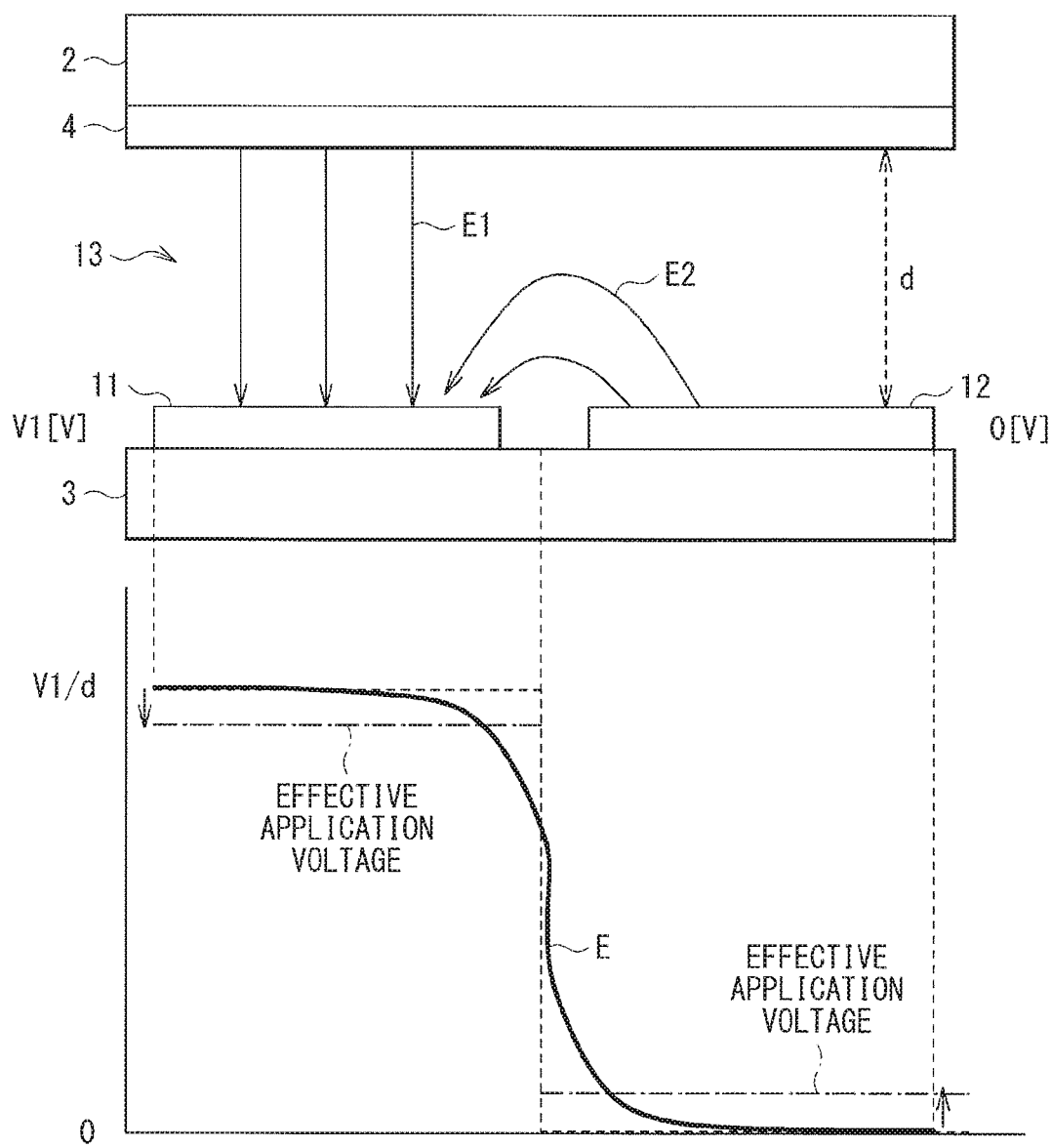

[FIG. 4]
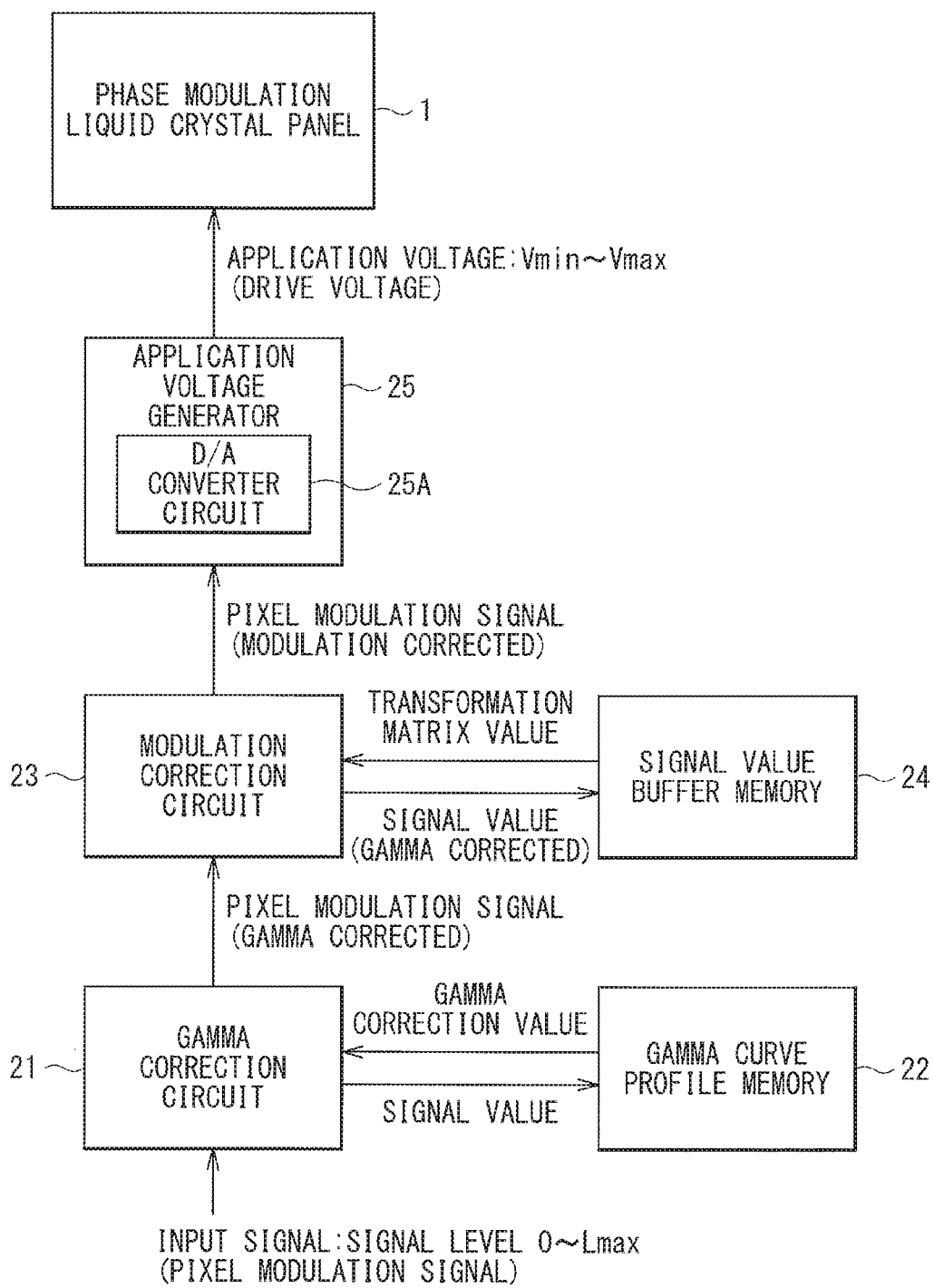

[FIG. 5]
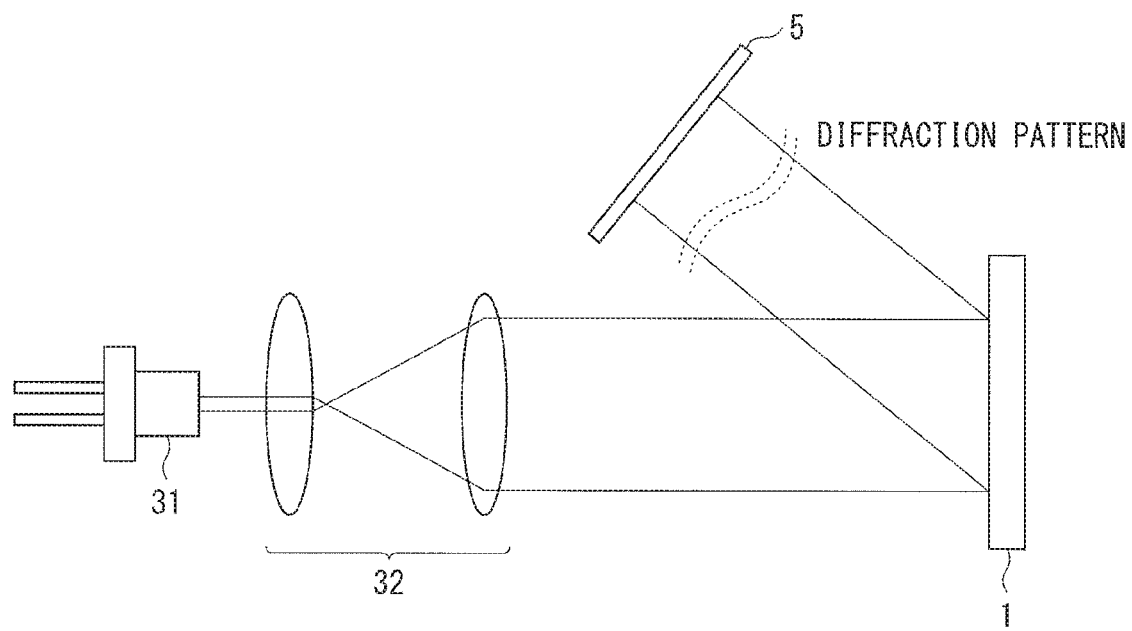
[FIG. 6]
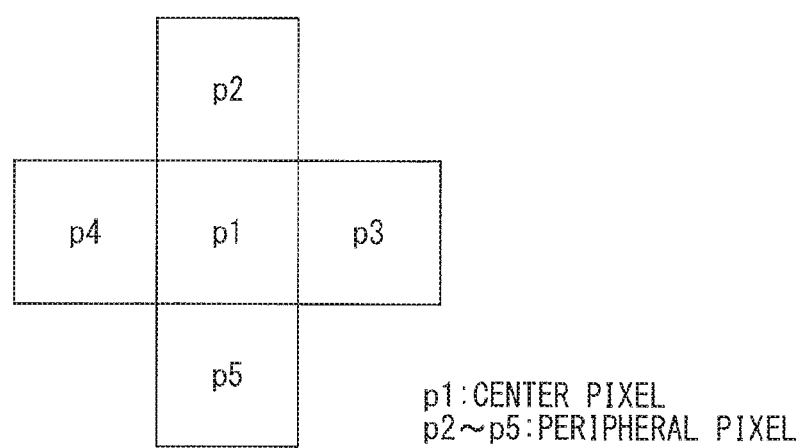
p1:CENTER PIXEL
p2~p5:PERIPHERAL PIXEL

[FIG. 7]
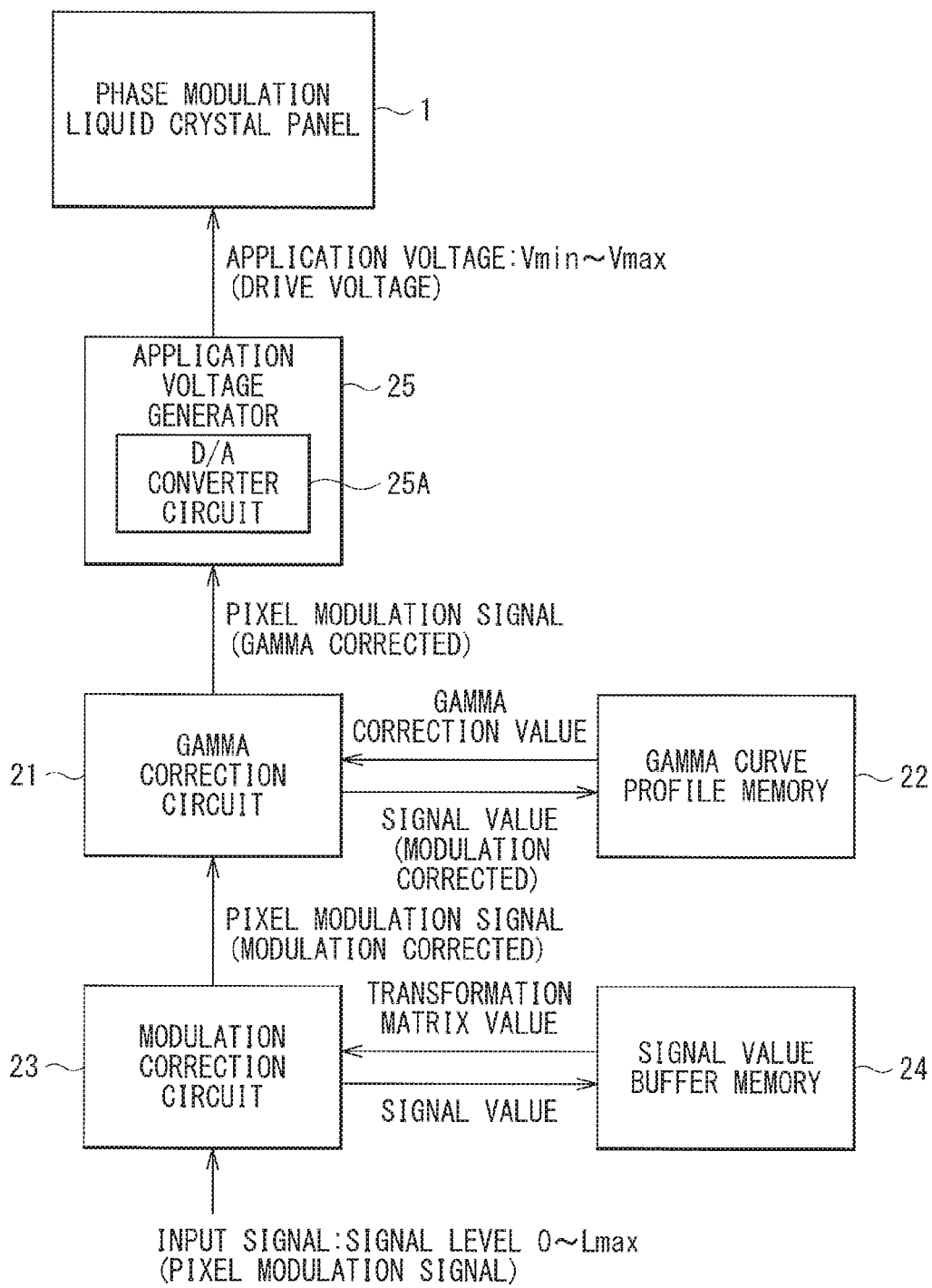

[ FIG. 8 ]
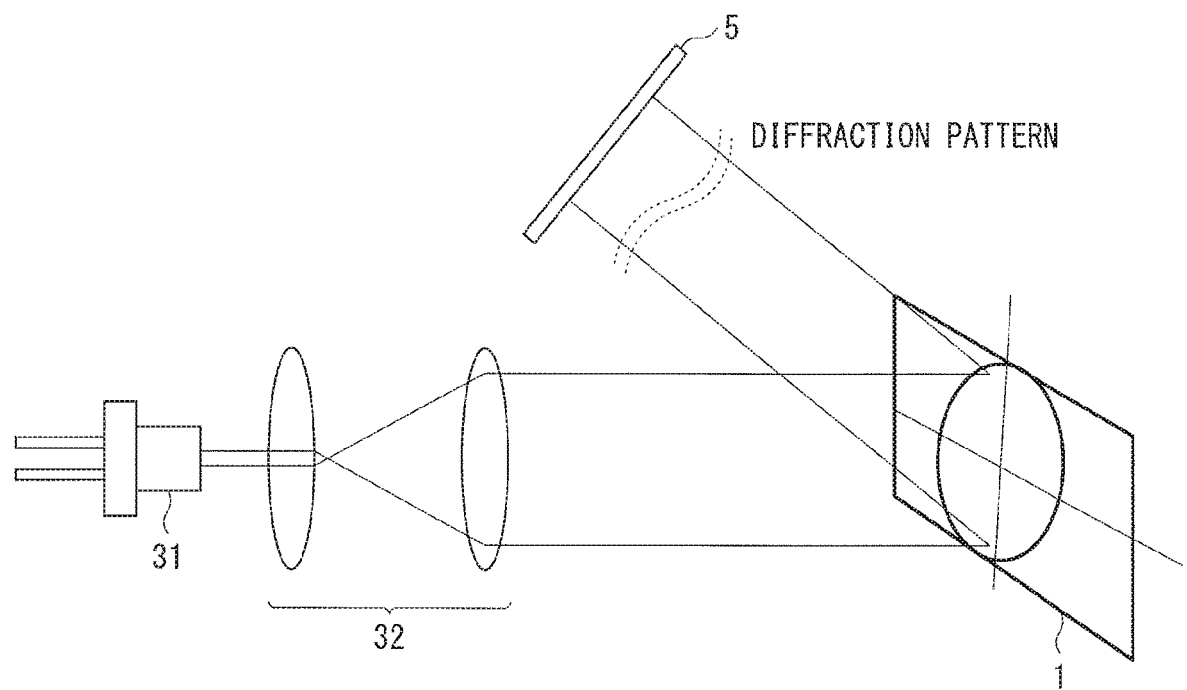
[ FIG. 9 ]
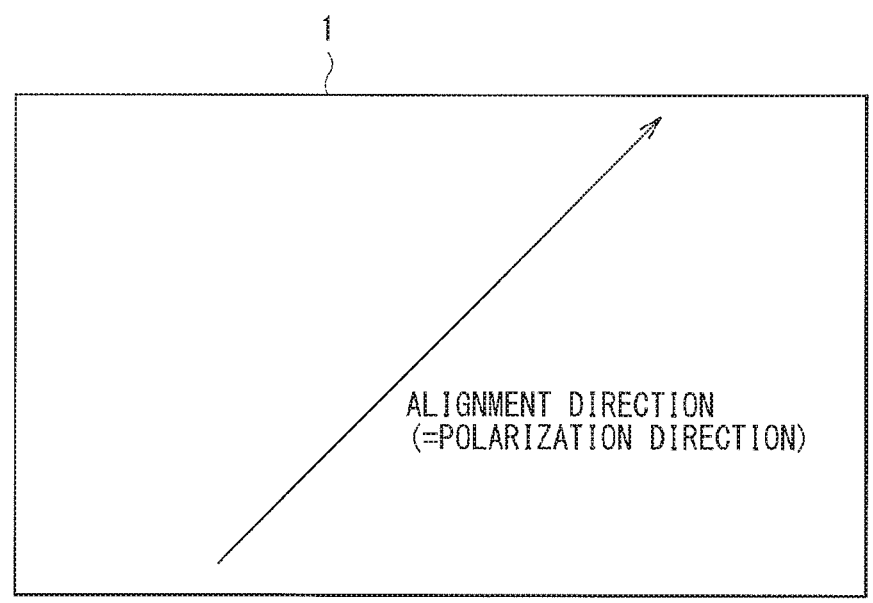

[ FIG. 10 ]
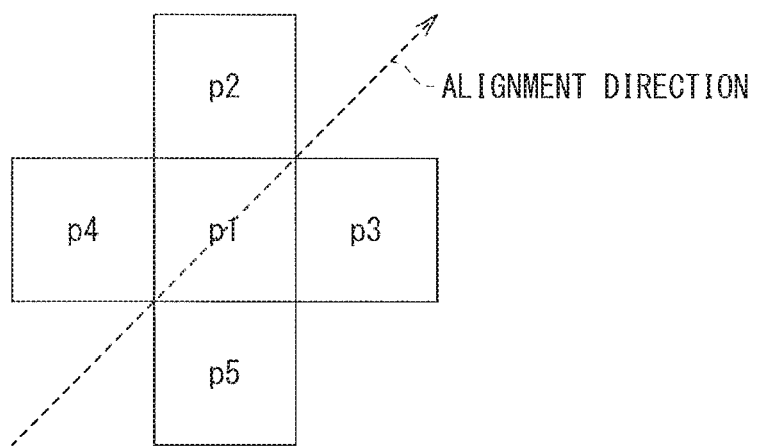
[ FIG. 11 ]
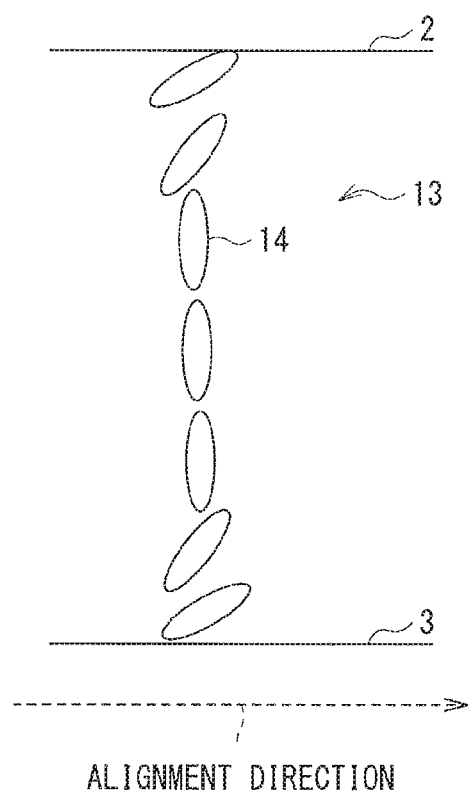

[FIG. 12]
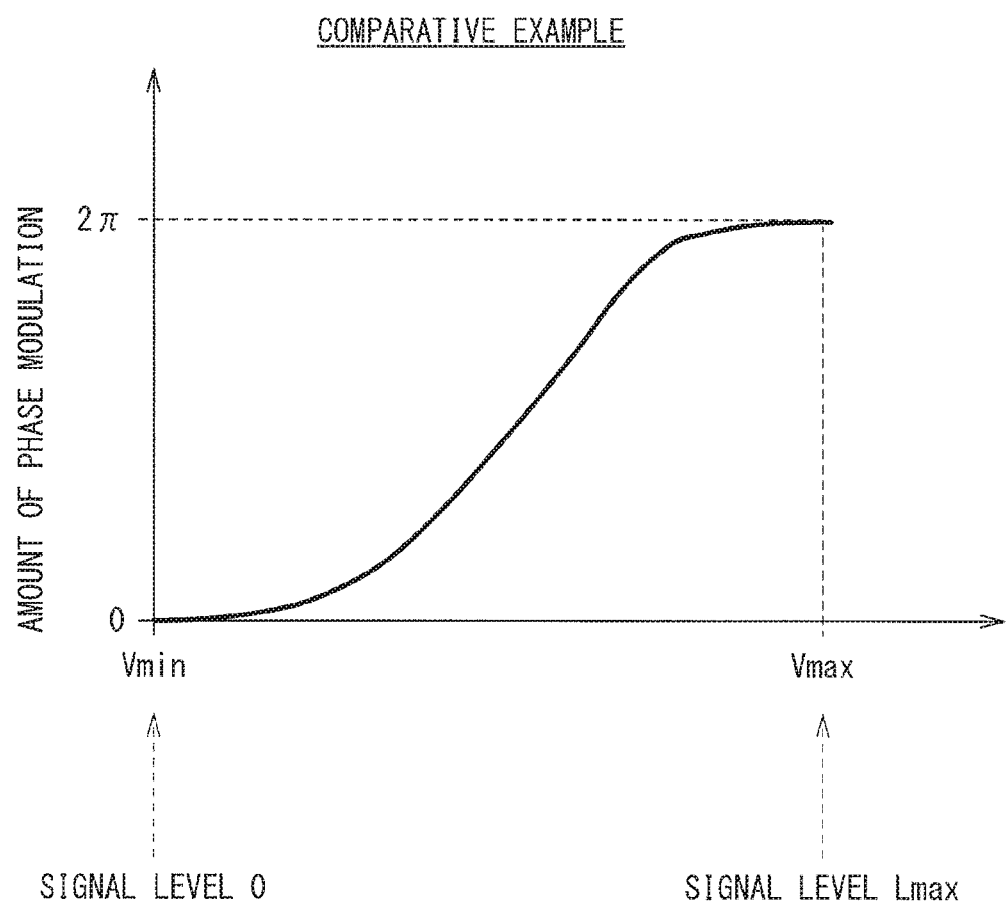

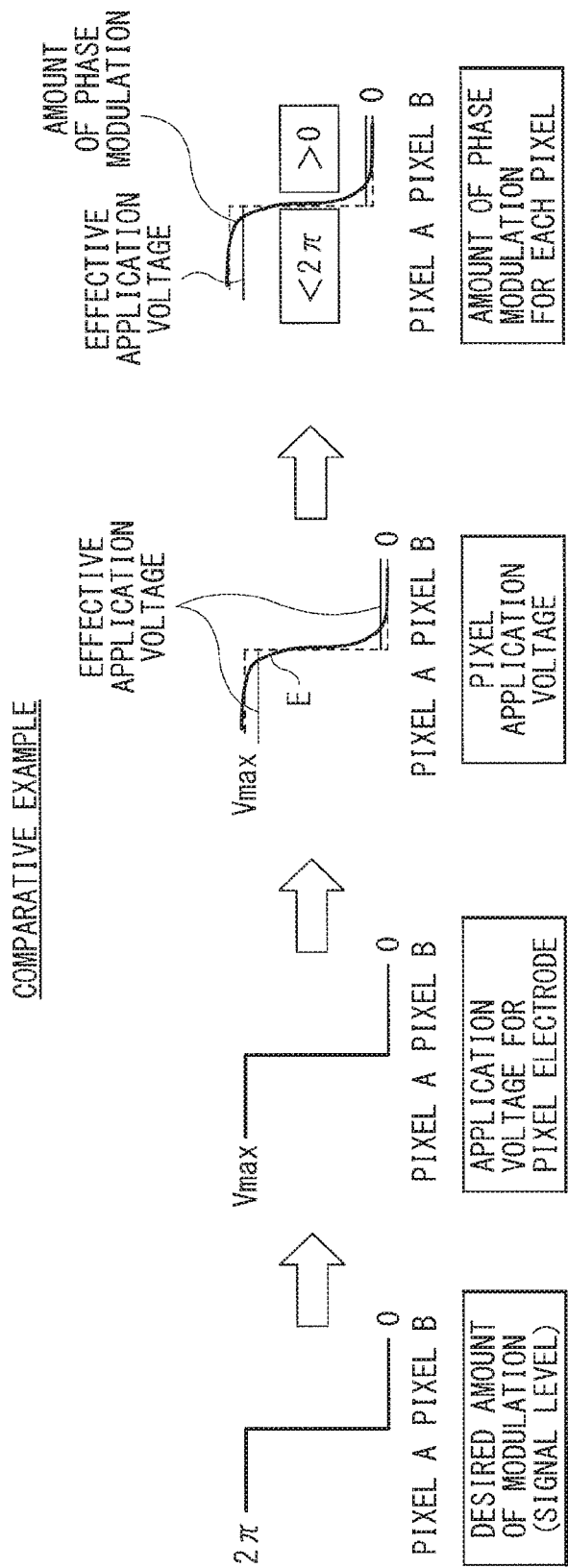

[FIG. 14]
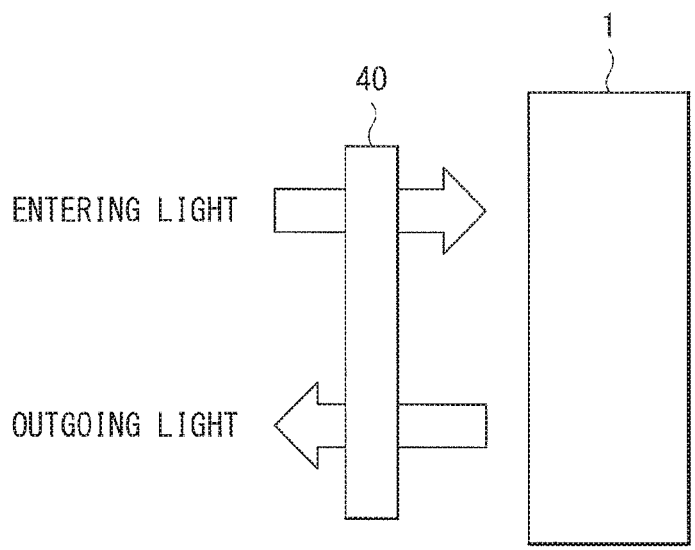
[FIG. 15]
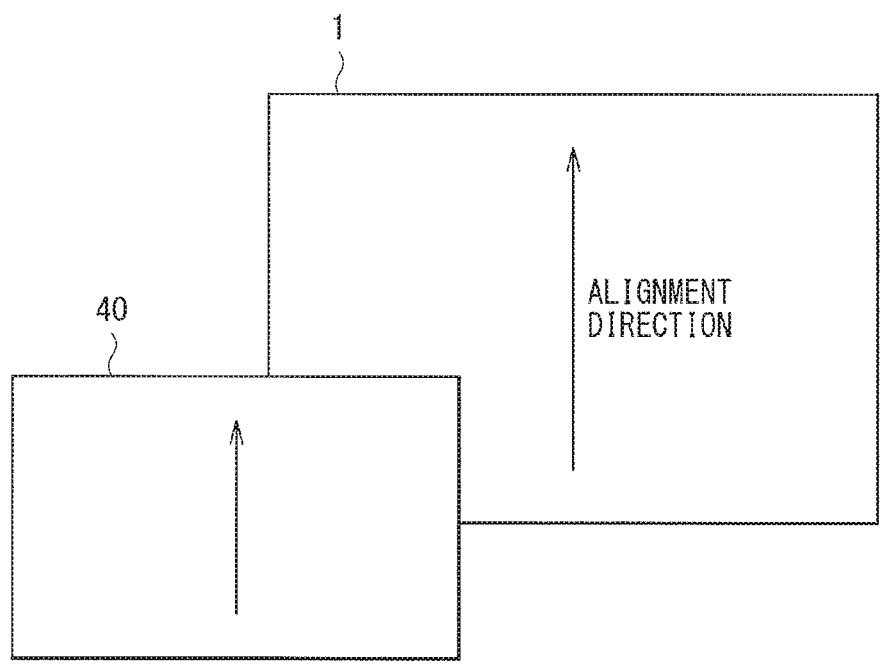

[FIG. 16]
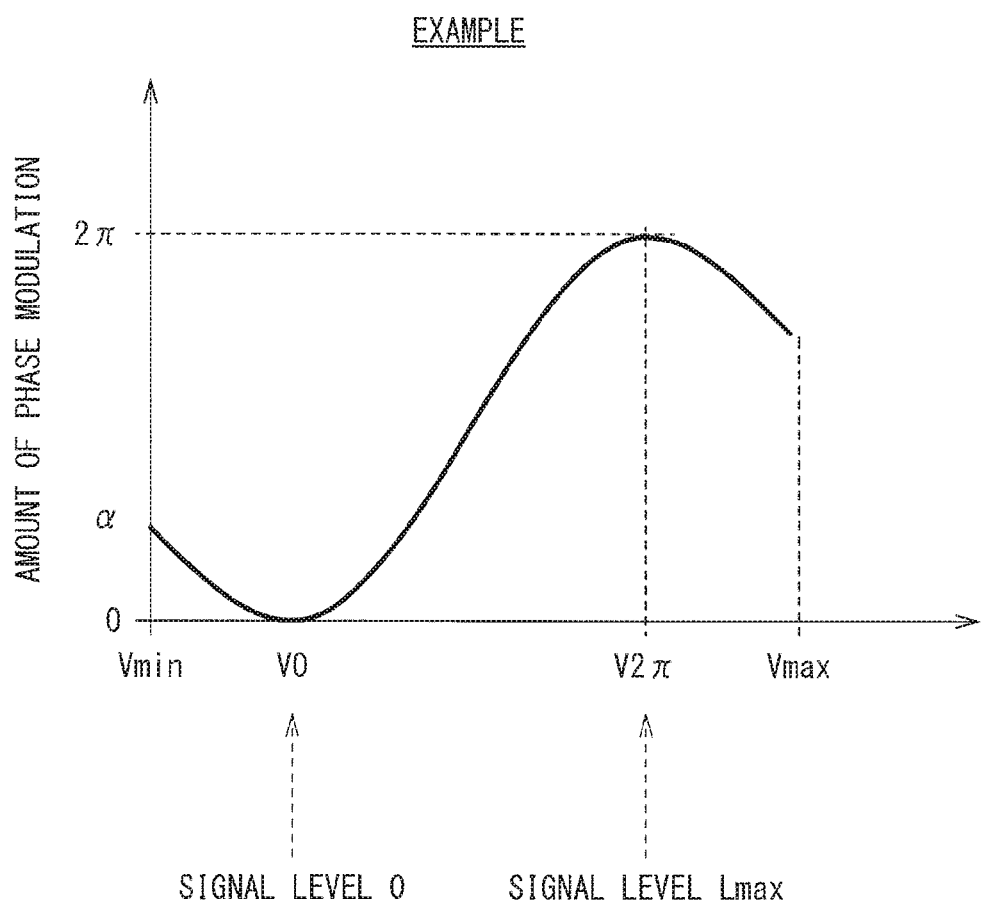

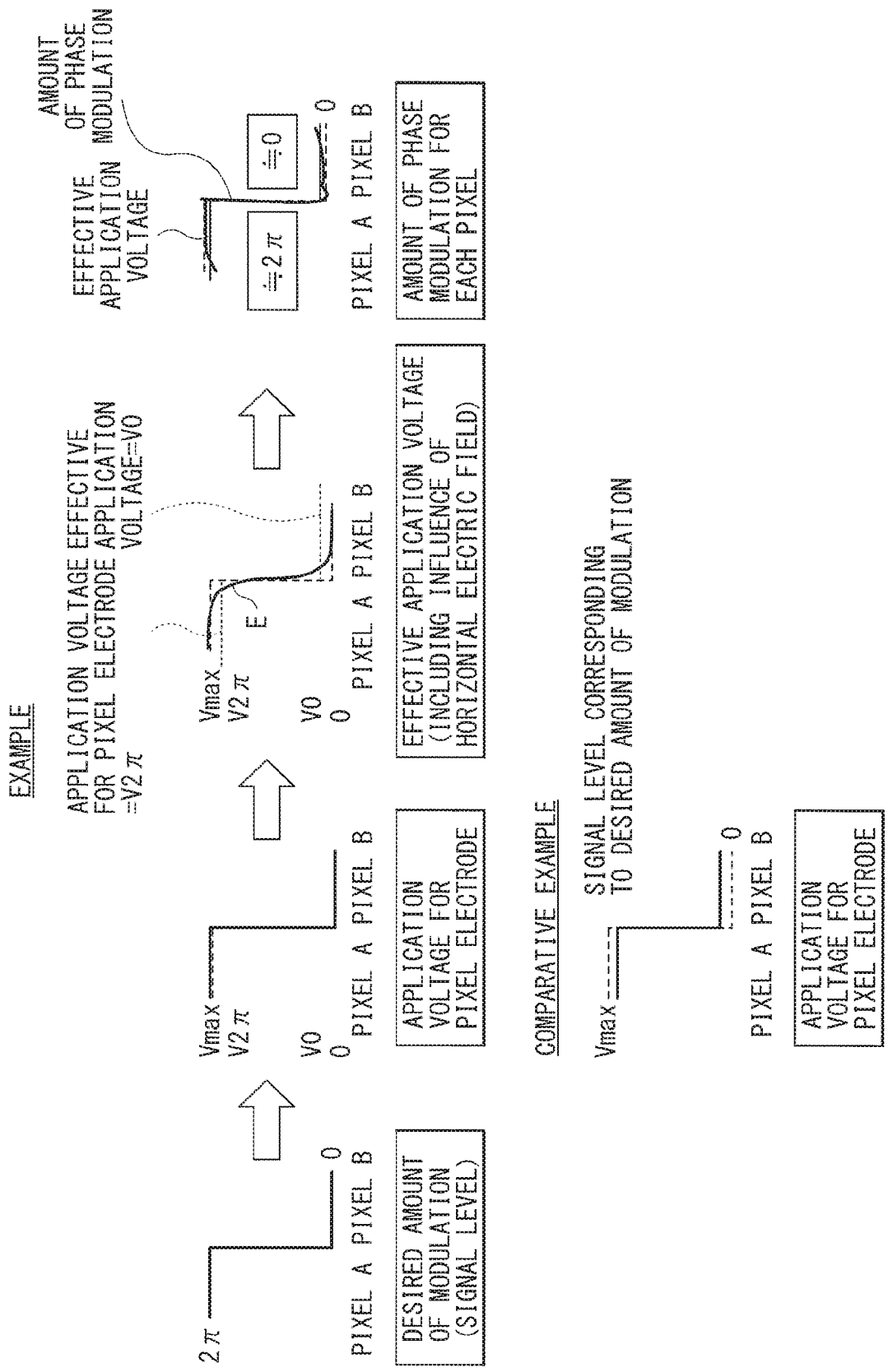
[FIG. 17]

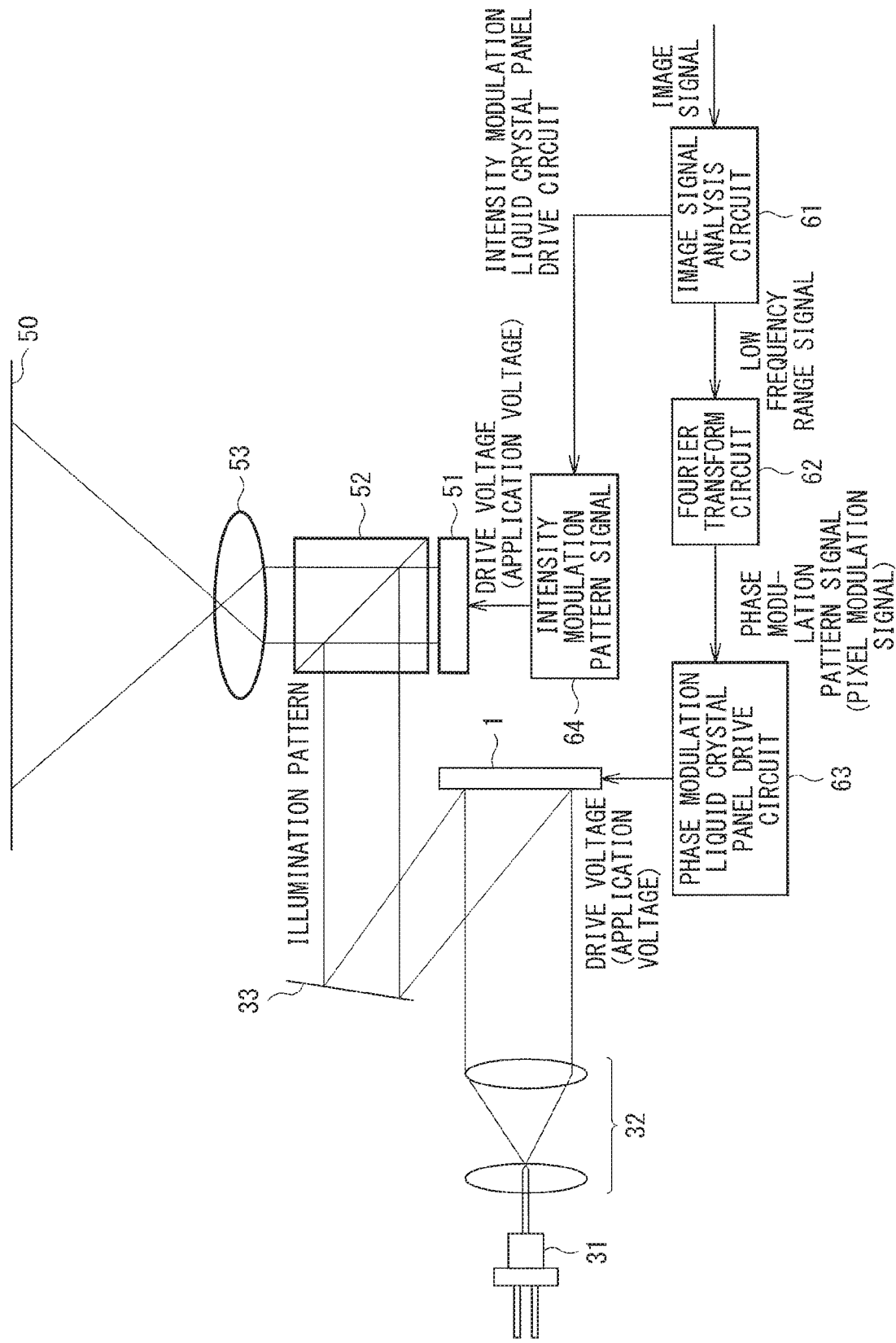
[FIG. 18]

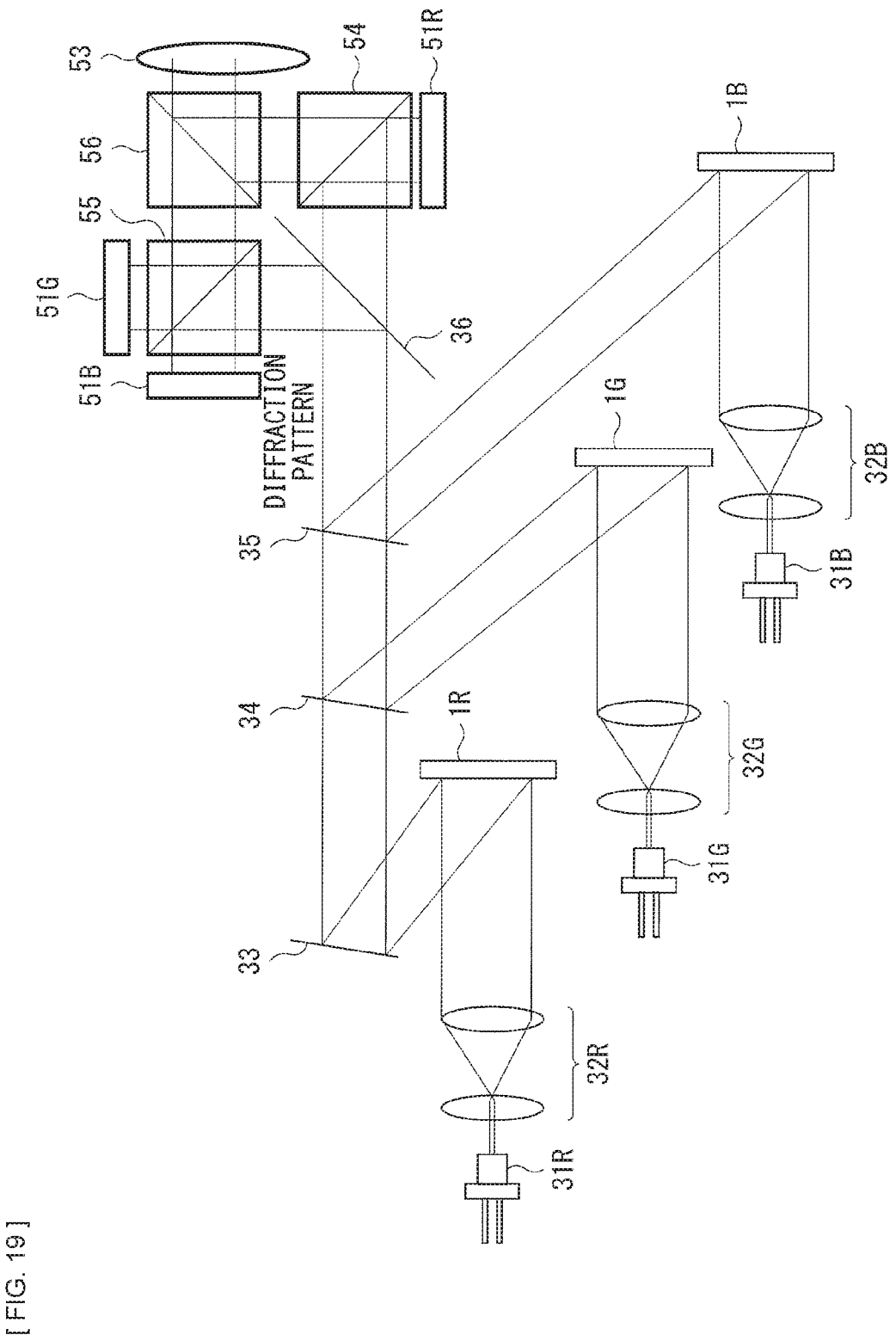

LIGHTING APPARATUS AND PROJECTOR

CROSS REFERENCE TO RELATED APPLICATIONS

This application is a U.S. National Phase of International Patent Application No. PCT/JP2018/005861 filed on Feb. 20, 2018, which claims priority benefit of Japanese Patent Application No. JP 2017-070193 filed in the Japan Patent Office on Mar. 31, 2017. Each of the above-referenced applications is hereby incorporated herein by reference in its entirety.

TECHNICAL FIELD

The disclosure relates to a lighting apparatus that modulates a phase of light and a projector that projects an image on the basis of illumination light from the lighting apparatus.

BACKGROUND ART

There is a technology that allows a liquid crystal panel to be used as a diffraction grating by modulating a phase of light from a light source for each pixel.

CITATION LIST

Patent Literature

PTL 1: Japanese Unexamined Patent Application Publication No. 2016-143037

SUMMARY OF THE INVENTION

As a result of a pixel pitch becoming narrower with an increase in a resolution of the liquid crystal panel, an increase in a voltage difference between adjacent ones of the pixels causes a failure to apply a normal voltage to each of the pixels. Such a phenomenon is called disclination. In a case where phase modulation is performed in the liquid crystal panel, disclination makes it difficult to perform diffraction as normal.

It is desirable to provide a lighting apparatus and a projector that enable phase modulation to be performed in a phase modulation liquid crystal panel at a desired amount of modulation.

A lighting apparatus according to an embodiment of the disclosure includes: a light source; a phase modulation liquid crystal panel that includes a plurality of pixels, the phase modulation liquid crystal panel modulating a phase of light from the light source for each of the pixels; a modulation signal corrector that performs signal correction that corrects a pixel modulation signal for a target pixel among the plurality of pixels on a basis of a pixel modulation signal for at least one peripheral pixel that is located around the target pixel to reduce a deviation amount relative to a desired amount of modulation of the target pixel; and an application voltage generator that generates an application voltage to be applied to each of the pixels on a basis of the pixel modulation signal having been corrected by the modulation signal corrector.

A projector according to an embodiment of the disclosure includes: a lighting apparatus; an intensity modulation panel that generates image light by intensity-modulating illumination light from the lighting apparatus on a basis of an intensity modulation signal; and a projection optical system that projects the image light, the lighting apparatus including: a light source; a phase modulation liquid crystal panel that includes a plurality of pixels, the phase modulation liquid crystal panel modulating a phase of light from the light source for each of the pixels; a modulation signal corrector that performs signal correction that corrects a pixel modulation signal for a target pixel among the plurality of pixels on a basis of a pixel modulation signal for at least one peripheral pixel that is located around the target pixel to reduce a deviation amount relative to a desired amount of modulation of the target pixel; and an application voltage generator that generates an application voltage to be applied to each of the pixels on a basis of the pixel modulation signal having been corrected by the modulation signal corrector.

In the lighting apparatus and the projector according to the embodiments of the disclosure, a pixel modulation signal for a target pixel among the plurality of pixels is corrected on a basis of a pixel modulation signal for at least one peripheral pixel that is located around the target pixel to reduce a deviation amount relative to a desired amount of modulation of the target pixel.

Since the pixel modulation signal for the target pixel is corrected on the basis of the pixel modulation signal for at least one peripheral pixel that is located around the target pixel to reduce the deviation amount relative to the desired amount of modulation of the target pixel, the lighting apparatus or the projector according to the embodiment of the disclosure enables phase modulation at the desired amount of modulation in the phase modulation liquid crystal panel.

It is to be noted that effects of the disclosure are not necessarily limited to the effect described above, and may include any of effects that are described herein.

BRIEF DESCRIPTION OF THE DRAWINGS

FIG. 1 is a plan view that schematically illustrates an example of a phase modulation liquid crystal panel.

FIG. 2 is an explanation diagram that illustrates an example of a relationship between a pixel position and an amount of phase modulation in the phase modulation liquid crystal panel.

FIG. 3 is an explanation diagram that illustrates an example of an electric field distribution in the phase modulation liquid crystal panel.

FIG. 4 is a block diagram that illustrates an exemplary circuit configuration of a lighting apparatus according to a first embodiment.

FIG. 5 is a configuration diagram that schematically illustrates an exemplary overall configuration of the lighting apparatus according to the first embodiment.

FIG. 6 is an explanation diagram that illustrates an example of a center pixel and peripheral pixels in the phase modulation liquid crystal panel.

FIG. 7 is a block diagram that illustrates an exemplary circuit configuration of a lighting apparatus according to a second embodiment.

FIG. 8 is a configuration diagram that schematically illustrates an exemplary overall configuration of a lighting apparatus according to a third embodiment.

FIG. 9 is a plan view that illustrates an example of an alignment direction in the phase modulation liquid crystal panel.

FIG. 10 is an explanation diagram that illustrates an example of a relationship between the alignment direction and the pixels in the phase modulation liquid crystal panel.

FIG. 11 is an explanation diagram that illustrates an example of a state of alignment of liquid crystal molecules in the phase modulation liquid crystal panel.

FIG. 12 is an explanation diagram that illustrates an example (Comparative Example) of a relationship between an application voltage and an amount of phase modulation for the phase modulation liquid crystal panel.

FIG. 13 is an explanation diagram that illustrates an actual amount of phase modulation resulting from driving the phase modulation liquid crystal panel in accordance with the relationship between the application voltage and the amount of phase modulation illustrated in FIG. 12.

FIG. 14 is a configuration diagram that schematically illustrates an example of a lighting apparatus according to a fourth embodiment.

FIG. 15 is an explanation diagram that schematically illustrates an example of a relationship between an alignment direction in a phase modulation liquid crystal panel and retardation by a retarder in the lighting apparatus according to the fourth embodiment.

FIG. 16 is an explanation diagram that illustrates an example of a relationship between an application voltage and an amount of phase modulation for the phase modulation liquid crystal panel according to the fourth embodiment.

FIG. 17 is an explanation diagram that illustrates an actual amount of phase modulation resulting from driving the phase modulation liquid crystal panel in accordance with the relationship between the application voltage and the amount of phase modulation illustrated in FIG. 16.

FIG. 18 is a configuration diagram that schematically illustrates an example of a projector according to a fifth embodiment.

FIG. 19 is a configuration diagram that schematically illustrates an example of a full-color projector according to the fifth embodiment.

DESCRIPTION OF EMBODIMENTS

In the following, some embodiments of the disclosure are described in detail with reference to the drawings. It is to be noted that description is made in the following order.

0. Comparative Example (Outline and Concerns about Phase Modulation Liquid Crystal Panel) (FIGS. 1 to 3)
1. First Embodiment (FIGS. 4 to 6)
   1.1 Configuration
   1.2 Detailed Description on Signal Correction
   1.3 Effect(s)
2. Second Embodiment (FIG. 7)
3. Third Embodiment (FIGS. 8 to 11)
4. Fourth Embodiment (FIGS. 12 to 17)
5. Fifth Embodiment (FIGS. 18 and 19)
6. Other Embodiment(s)

0. Comparative Example (Outline and Concerns about Phase Modulation Liquid Crystal Panel)

FIG. 1 schematically illustrates an example of a phase modulation liquid crystal panel 1. FIG. 2 illustrates an example of a relationship between a pixel position and an amount of phase modulation in the phase modulation liquid crystal panel 1. FIG. 3 illustrates an example of an electric field distribution in the phase modulation liquid crystal panel 1.

The phase modulation liquid crystal panel 1 includes a plurality of pixels 10 arranged in matrix. The phase modulation liquid crystal panel 1 is allowed to be used as a diffraction grating by modulating a phase of light from a light source for each of the pixels 10. For example, a brazed diffraction grating may be provided as illustrated in FIG. 2. In FIG. 2, an abscissa axis represents the pixel position and an ordinate axis represents the amount of phase modulation. For example, the amount of phase modulation ranges from 0 to $2\pi$.

As illustrated in FIG. 3, the phase modulation liquid crystal panel 1 includes a first glass substrate 2 and a second glass substrate 3 that are opposed to each other. A liquid crystal layer 13 is sealed between the first glass substrate 2 and the second glass substrate 3 by a sealing member (not illustrated).

The first glass substrate 2 is provided with a common electrode (opposite electrode) 4. The second glass substrate 3 is provided with a plurality of pixel electrodes. FIG. 3 illustrates two adjacent pixel electrodes 11 and 12, which are an example of the plurality of pixel electrodes.

A common voltage (e.g., 0 [V]) common to the plurality of pixel electrodes is applied to the common electrode 4. An application voltage corresponding to an input signal (pixel modulation signal) is applied to each of the plurality of pixel electrodes. In the example of FIG. 3, V1 [V] is applied to the pixel electrode 11 and 0 [V] to the pixel electrode 12. In FIG. 3, the liquid crystal layer 13 has a thickness d.

As illustrated in FIG. 3, if the application voltage is different between the adjacent two pixel electrodes 11 and 12, the electric field distribution is disturbed under an influence of a horizontal electric field, resulting in a failure to apply a predetermined application voltage. For example, referring to FIG. 3, an electric field E1 corresponding to the application voltage V1 [V] is generated between the common electrode 4 and the pixel electrode 11 and, additionally, a horizontal electric field E2 is generated between the common electrode 4 and the adjacent pixel electrode 12. An electric field distribution E between the adjacent two pixel electrodes 11 and 12 is disturbed under an influence of the horizontal electric field E2. This causes a voltage difference between an actual voltage (effective application voltage) applied to each of the pixel electrodes 11 and 12 and the predetermined application voltage. For example, the effective application voltage for the pixel electrode 11 becomes a smaller value than the predetermined desired application voltage V1 [V]. Meanwhile, for example, the effective application voltage for the pixel electrode 12 becomes a larger value than the predetermined desired application voltage 0 [V].

Such a voltage difference between the predetermined application voltage and the effective application voltage causes a deviation between the desired amount of modulation and the actual amount of modulation for each of the pixels as described above. Thus, for example, a brazed diffraction grating as illustrated in FIG. 2 fails to be reproduced, thereby lowering modulation efficiency.

Patent Literature 1 (Japanese Unexamined Patent Application Publication No. 2016-143037) discloses a technology that corrects an application voltage with a correction coefficient corresponding to the application voltage for each of the pixels with reference to respective application voltages for the pixels. Meanwhile, to generate the application voltage from the input signal, a signal processing such as gamma correction and uniformity correction may need to be performed. Correcting the application voltage with the correction coefficient affects the signal processing such as gamma correction and is thus unlikely to be possible. Moreover, in the liquid crystal panel, the application voltage and the amount of modulation may vary depending on in-plane positions due to, for example, a change in thickness of a liquid crystal layer. Thus, it is not always possible that the desired amount of modulation for each of the pixels is achieved by correcting the application voltage for the pixel to be corrected referring to the application voltage for the pixel adjacent to the pixel to be corrected.

Accordingly, for the phase modulation liquid crystal panel 1, a technology is demanded to be developed that reduces a modulation deviation amount relative to the desired amount of modulation due to the influence of the horizontal electric field and achieves phase modulation at the desired amount of modulation.

1. First Embodiment

1.1 Configuration

FIG. 4 schematically illustrates an exemplary circuit configuration of a lighting apparatus according to a first embodiment of the disclosure. FIG. 5 schematically illustrates an exemplary overall configuration of the lighting apparatus according to the first embodiment.

The lighting apparatus according to the first embodiment includes the phase modulation liquid crystal panel 1, a light source 31, and an expander 32 as illustrated in FIG. 5.

The expander 32 beam-expands light from the light source 31. The phase modulation liquid crystal panel 1 phase-modulates the light from the light source 31, which has been beam-expanded by the expander 32, on the basis of an input signal (pixel modulation signal) and irradiates an object 5 to be illuminated with illumination light with a desired diffraction pattern based on the pixel modulation signal. For example, the object 5 to be illuminated is an intensity modulation liquid crystal panel 51 (FIG. 18) of a projector described later.

It is to be noted that the phase modulation liquid crystal panel 1, which is illustrated as an optical system including a reflective liquid crystal panel in FIG. 5, may be a transmissive liquid crystal panel.

The lighting apparatus according to the present embodiment includes, as a drive circuit that drives the phase modulation liquid crystal panel 1, a gamma correction circuit 21, a gamma curve profile memory 22, a modulation correction circuit 23, a signal value buffer memory 24, and an application voltage generator 25 as illustrated in FIG. 4. The application voltage generator 25 includes a digital (D)/analog (A) converter circuit 25A.

For example, the gamma curve profile memory 22 stores a correspondence table of desired gamma correction curve and signal value. The gamma correction circuit 21 performs gamma correction on an input signal using a gamma correction value based on the correspondence table stored in the gamma curve profile memory 22. For example, the input signal is a pixel modulation signal with a minimum signal level of 0 and a maximum signal level Lmax. In other words, a signal level of the pixel modulation signal is a value ranging from 0 to Lmax. Incidentally, for example, the amount of phase modulation is a value ranging from 0 to $2\pi$. In this case, for example, the signal level 0=the amount of phase modulation 0 and the signal level Lmax=the amount of phase modulation $2\pi$ hold true. The gamma correction circuit 21 performs gamma correction to make the signal level and the amount of phase modulation proportional to each other.

The modulation correction circuit 23 is a modulation signal corrector that performs signal correction that corrects a pixel modulation signal for target one of the plurality of pixels of the phase modulation liquid crystal panel 1 on the basis of a pixel modulation signal for at least one peripheral pixel located around the target pixel to reduce a deviation amount relative to the desired amount of modulation of the target pixel. Herein, the deviation amount relative to the desired amount of modulation means a deviation amount based on a voltage difference between the application voltage for the target pixel and the application voltage for the peripheral pixel.

For example, the signal value buffer memory 24 stores correction data for correcting the pixel modulation signal to reduce the deviation amount relative to the desired amount of modulation of the target pixel, as described later. The correction data is data in the form of table or data of a calculation formula for correcting the pixel modulation signal, for example. The gamma-corrected pixel modulation signal is inputted to the modulation correction circuit 23. The modulation correction circuit 23 performs signal correction on the pixel modulation signal using a transformation matrix value based on the correction data stored in the signal value buffer memory 24.

The pixel modulation signal having been subjected to the signal correction by the modulation correction circuit 23 is inputted to the application voltage generator 25. The application voltage generator 25 generates the application voltage to be applied to each of the pixels of the phase modulation liquid crystal panel 1 on the basis of the pixel modulation signal having been corrected by the modulation correction circuit 23.

1.2 Detailed Description on Signal Correction

The signal correction by the modulation correction circuit 23 will be described below in detail.

The modulation correction circuit 23 corrects the influence of the horizontal electric field caused by the voltage difference between the application voltage for target one of the plurality of pixels of the phase modulation liquid crystal panel 1 and the application voltage for at least one peripheral pixel around the target pixel at a stage of processing the pixel modulation signal prior to generation of each of the application voltages. A correction value for the pixel modulation signal for the target pixel is calculated from the signal level for the target pixel and the signal level for the peripheral pixel with reference to the correction table or by the calculation formula stored in the signal value buffer memory 24, thereby obtaining the correction data.

FIG. 6 illustrates an example of one target pixel and the peripheral pixel in the phase modulation liquid crystal panel 1. The target pixel is hereinafter referred to as a center pixel p1. Peripheral pixels p2, p3, p4, and p5 are present around the center pixel p1, neighboring the center pixel p1 at upper, lower, right, and left sides.

The voltage difference between the application voltage corresponding to the signal level for the center pixel p1 and the application voltage corresponding to the signal level for at least one of the peripheral pixels changes a voltage to be effectively applied (effective application voltage) to the center pixel p1. Thus, the effective application voltage for the center pixel p1 is determined by determining the application voltage corresponding to the signal level for the center pixel p1 and the application voltage corresponding to the signal level for the peripheral pixel. The signal value buffer memory 24 stores, as the correction table, data regarding the voltage difference between the application voltage corresponding to the signal level for the center pixel p1 and the effective application voltage for the center pixel p1 in association with the application voltage corresponding to each signal level for at least one of the peripheral pixels. For example, assuming that a variation of the signal level of the pixel modulation signal includes discrete 10 levels, such as 0 to 9, and the four upper, lower, right, and left peripheral pixels are present as illustrated in FIG. 6, the data regarding the voltage difference includes $10^5$ =10000 possible combinations. The signal value buffer memory 24 stores such data regarding the voltage difference as the correction table. By referring to such a correction table, it is possible to determine a signal correction value at a high speed.

Moreover, the signal value buffer memory 24 may store data regarding the voltage difference between the application voltage corresponding to the signal level for the center pixel p1 and the application voltage corresponding to the signal level for at least one of the peripheral pixels. In this case, since it is not necessary to store the data regarding the application voltage corresponding to the signal level for the center pixel p1, the correction table only has to include $10^4$ pieces of data, allowing for reducing a capacity of the signal value buffer memory 24.

Moreover, as long as the voltage difference between the application voltage corresponding to the signal level for the center pixel p1 and the application voltage corresponding to the signal level for at least one of the peripheral pixels and the voltage difference between the application voltage corresponding to the signal level for the center pixel p1 and the effective application voltage for the center pixel p1 each have a predetermined linearity, it is possible to calculate the signal correction value for the center pixel p1 by a calculation formula:

the signal correction value for the center pixel p1= $(Cv-P1v) \cdot \alpha k$ where Cv denotes the application voltage corresponding to the signal level for the center pixel p1 and P1v denotes the application voltage corresponding to the signal level for the peripheral pixel.

The influence of all the peripheral pixels on the center pixel p1 is determined by a sum of respective signal correction values from the peripheral pixels pk (=p2, p3, p4, and p5). Here, $\alpha k$ denotes an influence coefficient applied to the center pixel p1 by the peripheral pixels pk. The influence of the upper, lower, right, and left peripheral pixels p2, p3, p4, and p5 on the center pixel p1 varies depending on an orientation of an alignment direction of liquid crystal molecules 14 (FIG. 11) in the phase modulation liquid crystal panel 1, which is described later in a third embodiment. Thus, it is desirable that respective values of $\alpha 2$, $\alpha 3$, $\alpha 4$, and $\alpha 5$ be independently provided. The correcting method using the above calculation formula advantageously allows for a considerably reduced capacity of the signal value buffer memory 24, since only the influence coefficient needs to be stored therein.

1.3 Effect(s)

According to the present embodiment described above, since the pixel modulation signal for the target pixel is corrected on the basis of the pixel modulation signal for at least one of the peripheral pixels located around the target pixel to reduce the deviation amount relative to the desired amount of modulation of the target pixel, as described above, it is possible to perform phase modulation on the phase modulation liquid crystal panel 1 at the desired amount of modulation.

It is to be noted that effect(s) described herein is not exhaustive but merely exemplary, and any other effects are possible. The same applies to effects of other embodiments hereinbelow.

2. Second Embodiment

Next, a lighting apparatus according to a second embodiment of the disclosure will be described. It is to be noted that for substantially the same components as those of the lighting apparatus according to the first embodiment, the same reference characters are used, and the explanations thereof are omitted as needed hereinbelow.

2.1 Configuration and Operation

FIG. 7 illustrates an exemplary circuit configuration of the lighting apparatus according to the second embodiment of the disclosure.

In the first embodiment, the gamma correction circuit 21 performs the gamma correction on the pixel modulation signal that has not been subjected to the signal correction by the modulation correction circuit 23. In contrast, in the present embodiment, the gamma correction circuit 21 performs the gamma correction on the pixel modulation signal that has been subjected to the signal correction by the modulation correction circuit 23. The signal correction by the modulation correction circuit 23 is substantially the same as in the first embodiment.

Other configuration(s), operation(s), and effect(s) are substantially the same as those of the lighting apparatus according to the first embodiment.

3. Third Embodiment

Next, a lighting apparatus according to a third embodiment of the disclosure will be described. It is to be noted that for substantially the same components as those of the lighting apparatus according to the first or second embodiment, the same reference characters are used, and the explanations thereof are omitted as needed hereinbelow.

FIG. 8 schematically illustrates an exemplary overall configuration of the lighting apparatus according to the third embodiment of the disclosure. FIG. 9 illustrates an example of an alignment direction in the phase modulation liquid crystal panel 1. FIG. 10 illustrates an example of a relationship between the alignment direction of the liquid crystal molecules 14 and the pixels in the phase modulation liquid crystal panel 1. FIG. 11 illustrates an example of a state of alignment of the liquid crystal molecules 14 in the phase modulation liquid crystal panel 1.

The description is made assuming that the phase modulation liquid crystal panel 1 is in a vertical alignment (VA) mode. As illustrated in FIG. 8, in performing phase modulation in the phase modulation liquid crystal panel 1 to obtain a diffraction pattern by making light enter the phase modulation liquid crystal panel 1, aligning a polarization direction of the entering light and the alignment direction of the liquid crystal molecules 14 in the phase modulation liquid crystal panel 1 is necessary for accurate phase modulation.

FIG. 9 illustrates an example of the alignment direction of the liquid crystal molecules 14 in the phase modulation liquid crystal panel 1 as seen from a light-entering direction. For example, in a case where the polarization direction of the entering light is inclined at 45 degrees with respect to a long-side direction of the phase modulation liquid crystal panel 1 as illustrated in FIG. 9, the alignment direction is also inclined at 45 degrees. An alignment film is vapor-deposited on a surface of each of the first glass substrate 2 and the second glass substrate 3 of the phase modulation liquid crystal panel 1 that is in contact with the liquid crystal layer 13. The alignment direction is able to be controlled by a direction for vapor-depositing the alignment film. In this regard, as illustrated in FIG. 11, it is known that the horizontal electric field has a large influence on pixels located in a direction for the liquid crystal molecules 14 to come into contact with the first glass substrate 2 and the second glass substrate 3 as pre-tilted.

For example, in the case of FIG. 10, the voltage difference and the signal difference between the peripheral pixel p2 and the peripheral pixel p3, which are respectively located at the upper and right sides of the center pixel p1, have a large influence on the center pixel p1. In this case, the correction by the modulation correction circuit 23, which is described in the above first or second embodiment, may be performed only on two of the peripheral pixels p2, p3, p4, and p5, i.e., the peripheral pixel p2 at the upper side and the peripheral pixel p3 at the right side. This allows for reducing a storage capacity for the correction table to be stored in the signal value buffer memory 24. In a case of using the method that includes storing the calculation formula for correction in the signal value buffer memory 24, it is possible to simplify the calculation formula.

It is to be noted that in a case where the alignment direction is an upper direction, for example, the voltage difference and the signal difference of the peripheral pixels p2 at the upper side have a large influence on the center pixel p1. In this case, the correction by the modulation correction circuit 23 described in the above first or second embodiment may be performed only on one of the peripheral pixels p2, p3, p4, and p5, i.e., the peripheral pixel p2 at the upper side.

Other configuration(s), operation(s), and effect(s) may be substantially the same as those of the lighting apparatus according to the first or second embodiment.

4. Fourth Embodiment

Next, a lighting apparatus according to a fourth embodiment of the disclosure will be described. It is to be noted that for substantially the same components as those of the lighting apparatus according to any one of the first to third embodiments, the same reference characters are used, and the explanations thereof are omitted as needed hereinbelow.

Comparative Example

FIG. 12 illustrates an example (Comparative Example) of a relationship between the application voltage and the amount of phase modulation for the phase modulation liquid crystal panel 1. FIG. 13 illustrates an actual amount of phase modulation resulting from driving the phase modulation liquid crystal panel 1 in accordance with the relationship between the application voltage and the amount of phase modulation illustrated in FIG. 12. FIG. 13 illustrates respective examples of desired amount of modulation, application voltage, effective application voltage, and amount of phase modulation of adjacent two pixel A and pixel B.

As illustrated in FIG. 12, a minimum value and a maximum value of the application voltage to be applied to each of the pixels of the phase modulation liquid crystal panel 1 are respectively denoted by Vmin and Vmax. Moreover, a value of the application voltage that minimizes the amount of phase modulation relative to light provided with a phase difference through a retarder is denoted by V0, and a value of the application voltage that maximizes amount of phase modulation is denoted by V2π. Moreover, the application voltage generator 25 assigns a minimum signal level (0) of the pixel modulation signal not having been subjected to the signal correction by the modulation correction circuit 23 to Vmin and assigns a maximum signal level Lmax of the pixel modulation signal not having been subjected to the signal correction to Vmax.

In a case where the relationship between the signal level of the pixel modulation signal, the application voltage, and the amount of phase modulation is defined as illustrated in FIG. 12 with the signal level (amount of phase modulation) of the center pixel p1 (pixel B) being 0 and the signal level of the peripheral pixel (pixel A) exceeding 0 as illustrated in FIG. 13, the effective application voltage for the center pixel p1 exceeds 0. In this case, to perform the signal correction described in the above first embodiment, the signal correction value provided by the modulation correction circuit 23 needs to have a negative signal level. In addition, the application voltage generator 25 needs to provide a negative application voltage. However, it is actually not possible to prepare the negative signal level and the negative application voltage.

An example that allows for avoiding the necessity of such negative signal level and negative application voltage being necessitated will be described below as the fourth embodiment of the disclosure.

EXAMPLE

FIG. 14 schematically illustrates an example of the lighting apparatus according to the fourth embodiment of the disclosure. FIG. 15 schematically illustrates an example of a relationship between the alignment direction in the phase modulation liquid crystal panel 1 and retardation by a retarder 40 in the lighting apparatus according to the fourth embodiment. FIG. 16 illustrates an example of a relationship between the application voltage and the amount of phase modulation for the phase modulation liquid crystal panel 1 according to the fourth embodiment. FIG. 17 illustrates an actual amount of phase modulation resulting from driving the phase modulation liquid crystal panel 1 in accordance with the relationship between the application voltage and the amount of phase modulation illustrated in FIG. 16. FIG. 17 illustrates respective examples of desired amount of modulation, application voltage, effective application voltage, and amount of phase modulation of the adjacent two pixel A and pixel B.

The lighting apparatus according to the fourth embodiment includes the retarder 40 that provides retardation (phase difference) to entering light and outputs the light to the phase modulation liquid crystal panel 1 as illustrated in FIG. 14 and FIG. 15. An amount of the phase difference provided by the retarder 40 is $-\alpha$.

The light passing through the retarder 40 is phase-modulated by $-\alpha$. The minimum value and the maximum value of the application voltage to be applied to the phase modulation liquid crystal panel 1 are respectively denoted by Vmin and Vmax. At Vmin, the amount of phase modulation is $\alpha$. At this time, the voltage applied to the phase modulation liquid crystal panel 1 and the amount of phase modulation by the phase modulation liquid crystal panel 1 are as illustrated in FIG. 16. An initial phase is retarded by $\alpha$.

The value of the application voltage that provides the minimum amount of phase modulation relative to the light provided with the phase difference through the retarder 40 is denoted by V0 and the value of the application voltage that provides the maximum amount of phase modulation is denoted by V2π.

As illustrated in FIG. 16, the application voltage generator 25 assigns the minimum signal level (0) of the pixel modulation signal not having been subjected to the signal correction by the modulation correction circuit 23 to V0 and assigns the maximum signal level Lmax of the pixel modulation signal not having been subjected to the signal correction to V2π. When a voltage applicable to the phase modulation liquid crystal panel 1 ranges from 0 (=Vmin) to V max, $$0(=Vmin) < V0 < V2\pi < Vmax$$

is satisfied.

Thus, even when the signal level for the center pixel p1 (pixel B) is 0 and the signal level for the peripheral pixel (pixel A) is Lmax, it is possible to make the correction value for the influence from the peripheral pixel negative with respect to V0 (Vmin to V0), thus allowing the effective application voltage for the center pixel p1 to be V0 as illustrated in FIG. 17.

Contrarily, even when the signal level of the center pixel p1 is Lmax and the signal level of the peripheral pixel is 0, the effective application voltage for the center pixel p1 is allowed to be V2π by making a correction voltage for the center pixel p1 fall within a range from V2π to Vmax, thus correcting the signal level as desired.

Other configuration(s), operation(s), and effect(s) may be substantially the same as those of the lighting apparatus according to any one of the first to third embodiments.

5. Fifth Embodiment

Next, a fifth embodiment of the disclosure will be described. It is to be noted that for substantially the same components as those of the lighting apparatus according to any one of the first to fourth embodiments, the same reference characters are used, and the explanations thereof are omitted as needed hereinbelow.

The lighting apparatuses according to the above first to fourth embodiments are usable as a lighting apparatus in a projector, for example.

Example of Application to Projector

FIG. 18 illustrates an example of a projector according to the fifth embodiment of the disclosure.

The projector includes an intensity modulation liquid crystal panel 51, a polarizing beam splitting/combining device 52, and a projection lens 53. The projector also includes an image signal analysis circuit 61, a Fourier transform circuit 62, a phase modulation liquid crystal panel drive circuit 63, and an intensity modulation liquid crystal panel drive circuit 64. The projector also includes the phase modulation liquid crystal panel 1, the light source 31, the expander 32, and the mirror 33. The phase modulation liquid crystal panel drive circuit 63 includes the circuit illustrated in FIG. 4 or FIG. 7.

As illustrated in FIG. 18, the diffraction pattern achieved by the phase modulation by the phase modulation liquid crystal panel 1 is applied in the form of illumination light through the mirror 33 to the intensity modulation liquid crystal panel 51, which performs intensity modulation. The applied diffraction pattern is then intensity-modulated by the intensity modulation liquid crystal panel 51, generating image light. The projection lens 53 projects the generated image light onto a screen 50. Using the phase-modulated illumination light provides a high dynamic range projector that enables light to be concentrated only on a bright portion in an image signal.

The image signal analysis circuit 61 is an image signal circuit that generates an intensity modulation signal on the basis of an image pattern represented by the image signal and an illumination pattern calculated on the basis of the image signal. The image signal analysis circuit 61 analyzes the applied image signal, generates a spatially low frequency range signal, and calculates the illumination pattern. The Fourier transform circuit 62 performs Fourier transform of the illumination pattern to achieve diffraction that provides this illumination pattern, generates a phase modulation pattern signal, and outputs the phase modulation pattern signal to the phase modulation liquid crystal panel drive circuit 63.

The phase modulation liquid crystal panel drive circuit 63 converts the phase modulation pattern to an application voltage and outputs the application voltage to the phase modulation liquid crystal panel 1. The phase modulation liquid crystal panel drive circuit 63, which includes the modulation correction circuit 23 illustrated in FIG. 4 or FIG. 7, enables phase modulation at the desired amount of modulation in the phase modulation liquid crystal panel 1. The illumination pattern phase-modulated at the desired amount of modulation is applied onto the intensity modulation liquid crystal panel 51.

The image signal analysis circuit 61 generates an intensity modulation pattern signal from the illumination pattern and the image signal and inputs the intensity modulation pattern signal to the intensity modulation liquid crystal panel drive circuit 64. Specifically, the intensity modulation pattern signal is generated in accordance with "image pattern/illumination pattern=intensity modulation pattern." The intensity modulation liquid crystal panel drive circuit 64 drives the intensity modulation liquid crystal panel 51 with a drive voltage based on the inputted intensity modulation pattern. As a result, the illumination light intensity-modulated by the intensity modulation liquid crystal panel 51 functions as an image light that reproduces the original image signal.

According to the present embodiment, the light is concentrated on a bright portion while not applied to a dark portion, thereby providing a high contrast projector.

Example of Application to Full-Color Projector

FIG. 19 schematically illustrates an example of a full-color projector according to the fifth embodiment.

The full-color projector includes a red-light source 31R, a green-light source 31G, and a blue-light source 31B in place of the light source 31 of the projector illustrated in FIG. 18. The full-color projector also includes an expander 32R, an expander 32G, and an expander 32B in place of the expander 32.

The full-color projector also includes the mirror 33, a dichroic mirror 34, a dichroic mirror 35, and a dichroic mirror 36. The full-color projector also includes a polarizing beam splitting/combining device 54, a polarizing beam splitting/combining device 55, and a light combining device 56. In addition, the full-color projector also includes a red-light intensity modulation liquid crystal panel 51R, a green-light intensity modulation liquid crystal panel 51G, and a blue-light intensity modulation liquid crystal panel 51B.

The red-light source 31R is a laser source that emits red light. The green-light source 31G is a laser source that emits green light. The blue-light source 31B is a laser source that emits blue light.

The expander 32R is located on an optical path of the red light, beam-expanding the red light from the red-light source 31R. The expander 32G is located on an optical path of the green light, beam-expanding the green light from the green-light source 31G. The expander 32B is located on an optical path of the blue light, beam-expanding the blue light from the blue-light source 31B.

The red-light phase modulation liquid crystal panel 1R performs phase modulation of the red light beam-expanded by the expander 32R. The green-light phase modulation liquid crystal panel 1G performs phase modulation of the green light beam-expanded by the expander 32G. The blue-light phase modulation liquid crystal panel 1B performs phase modulation of the blue light beam-expanded by the expander 32B.

The mirror 33 reflects the red light phase-modulated by the red-light phase modulation liquid crystal panel 1R at a high reflectance. The dichroic mirror 34 lets the red light reflected by the mirror 33 at the high reflectance through at a high transmittance, while reflecting the green light phase-modulated by the green-light phase modulation liquid crystal panel 1G at a high reflectance. The dichroic mirror 35 lets the red light and the green light from the dichroic mirror 34 through at a high transmittance, while reflecting the blue light phase-modulated by the green-light phase modulation liquid crystal panel 1G at a high reflectance. The dichroic mirror 36 lets the red light from the dichroic mirror 35 through at a high transmittance, while reflecting the blue light and the green light at a high reflectance.

The polarizing beam splitting/combining device 54 outputs the phase-modulated red light toward the red-light intensity modulation liquid crystal panel 51R, while outputting the red light intensity-modulated by the red-light intensity modulation liquid crystal panel 51R toward the light combining device 56. The polarizing beam splitting/combining device 55 outputs the phase-modulated green light toward the green-light intensity modulation liquid crystal panel 51G, while outputting the green light intensity-modulated by the green-light intensity modulation liquid crystal panel 51G toward the light combining device 56. Moreover, the polarizing beam splitting/combining device 55 outputs the phase-modulated blue light toward the blue-light intensity modulation liquid crystal panel 51B, while outputting the blue light intensity-modulated by the blue-light intensity modulation liquid crystal panel 51B toward the light combining device 56.

The red-light intensity modulation liquid crystal panel 51R performs intensity modulation of red illumination light. The green-light intensity modulation liquid crystal panel 51G performs intensity modulation of green illumination light. The blue-light intensity modulation liquid crystal panel 51B performs intensity modulation of blue illumination light.

The light combining device 56 outputs combined light of the intensity-modulated red light, green light, and blue light toward the projection lens 53.

Other basic configurations and operations, except the phase modulation and intensity modulation being performed for each color, are substantially the same as those of the projector illustrated in FIG. 18.

6. Other Embodiments

The technology according to the disclosure is by no means limited to the descriptions of the above embodiments but may be modified in a variety of manners.

Each of the above embodiments is described with reference to the example where the phase modulation liquid crystal panel 1 has a configuration corresponding to so-called normally black, in which the amount of modulation increases with an increase in the application voltage. However, the technology according to the disclosure may also be applied to a configuration corresponding to so-called normally white, in which the amount of modulation decreases with an increase in the application voltage.

For example, the disclosure may have the following configurations.

(1)

A lighting apparatus, including:

a light source;

a phase modulation liquid crystal panel that includes a plurality of pixels, the phase modulation liquid crystal panel modulating a phase of light from the light source for each of the pixels;

a modulation signal corrector that performs signal correction that corrects a pixel modulation signal for a target pixel among the plurality of pixels on a basis of a pixel modulation signal for at least one peripheral pixel that is located around the target pixel to reduce a deviation amount relative to a desired amount of modulation of the target pixel; and an application voltage generator that generates an application voltage to be applied to each of the pixels on a basis of the pixel modulation signal having been corrected by the modulation signal corrector.

(2)

The lighting apparatus according to (1), further including a gamma correction circuit that performs gamma correction on the pixel modulation signal not having been subjected to the signal correction by the modulation signal corrector.

(3)

The lighting apparatus according to (2), further including a gamma correction circuit that performs gamma correction on the pixel modulation signal having been subjected to the signal correction by the modulation signal corrector.

(4)

The lighting apparatus according to any one of (1) to (3), in which the peripheral pixel includes at least a pixel located in an alignment direction of a liquid crystal in the phase modulation liquid crystal panel with respect to the target pixel.

(5)

The lighting apparatus according to any one of (1) to (4), further including a retarder that provides a phase difference to the light from the light source and outputs the light to phase modulation liquid crystal panel.

(6)

The lighting apparatus according to (5), in which a relationship of $Vmin < V0 < V2\pi < Vmax$ is satisfied, when:

a minimum value and a maximum value of the application voltage to be applied to each of the pixels of the phase modulation liquid crystal panel are respectively denoted by Vmin and Vmax; and a value of the application voltage that minimizes an amount of phase modulation with respect to the light provided with the phase difference by the retarder is denoted by V0 and a value of the application voltage that maximizes the amount of phase modulation is represented by $V2\pi$, and the application voltage generator assigns a minimum signal level of the pixel modulation signal not having been subjected to signal correction by the modulation signal corrector to V0 and assigns a maximum signal level of the pixel modulation signal not having been subjected to the signal correction to V2π.

(7)

The lighting apparatus according to any one of (1) to (6), in which the deviation amount relative to the desired amount of modulation includes a deviation amount based on a voltage difference between the application voltage for the target pixel and the application voltage for the peripheral pixel.

(8)

A projector, including:
a lighting apparatus;
an intensity modulation panel that generates image light by intensity-modulating illumination light from the lighting apparatus on a basis of an intensity modulation signal; and
a projection optical system that projects the image light, the lighting apparatus including:
a light source;
a phase modulation liquid crystal panel that includes a plurality of pixels, the phase modulation liquid crystal panel modulating a phase of light from the light source for each of the pixels;
a modulation signal corrector that performs signal correction that corrects a pixel modulation signal for a target pixel among the plurality of pixels on a basis of a pixel modulation signal for at least one peripheral pixel that is located around the target pixel to reduce a deviation amount relative to a desired amount of modulation of the target pixel; and
an application voltage generator that generates an application voltage to be applied to each of the pixels on a basis of the pixel modulation signal having been corrected by the modulation signal corrector.

(9)

The projector according to (8), further including
an image signal circuit that generates the intensity modulation signal on a basis of an image pattern represented by an image signal and an illumination pattern calculated on a basis of the image signal.

This application claims the benefit of Japanese Priority Patent Application No. 2017-070193 filed with the Japan Patent Office on Mar. 31, 2017, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A lighting apparatus, comprising:
a light source;
a phase modulation liquid crystal panel that includes a plurality of pixels, wherein the phase modulation liquid crystal panel modulates a phase of light from the light source for each of the plurality of pixels;
a modulation signal corrector that performs signal correction that corrects a pixel modulation signal for a target pixel among the plurality of pixels based on a pixel modulation signal for at least one peripheral pixel that is located around the target pixel to reduce a deviation amount relative to a desired amount of modulation of the target pixel; and
an application voltage generator that generates an application voltage to be applied to each of the plurality of pixels based on the pixel modulation signal having been corrected by the modulation signal corrector.

2. The lighting apparatus according to claim 1, further comprising
a gamma correction circuit that performs gamma correction on the pixel modulation signal not having been subjected to the signal correction by the modulation signal corrector.

3. The lighting apparatus according to claim 1, further comprising
a gamma correction circuit that performs gamma correction on the pixel modulation signal having been subjected to the signal correction by the modulation signal corrector.

4. The lighting apparatus according to claim 1, wherein
the peripheral pixel includes at least a pixel located in an alignment direction of a liquid crystal in the phase modulation liquid crystal panel with respect to the target pixel.

5. The lighting apparatus according to claim 1, further comprising
a retarder that provides a phase difference to the light from the light source and outputs the light to the phase modulation liquid crystal panel.

6. The lighting apparatus according to claim 5, wherein
a relationship of Vmin <V0 <V2π<Vmax is satisfied, when:
a minimum value and a maximum value of the application voltage to be applied to each of the plurality of pixels of the phase modulation liquid crystal panel are respectively denoted by Vmin and Vmax; and
a value of the application voltage that minimizes an amount of phase modulation with respect to the light provided with the phase difference by the retarder is denoted by V0 and a value of the application voltage that maximizes the amount of phase modulation is represented by V2π, and
the application voltage generator assigns a minimum signal level of the pixel modulation signal not having been subjected to signal correction by the modulation signal corrector to V0 and assigns a maximum signal level of the pixel modulation signal not having been subjected to the signal correction to V2π.

7. The lighting apparatus according to claim 1, wherein
the deviation amount relative to the desired amount of modulation comprises a deviation amount based on a voltage difference between the application voltage for the target pixel and the application voltage for the peripheral pixel.

8. A projector, comprising:
a lighting apparatus;
an intensity modulation panel that generates image light by intensity-modulating illumination light from the lighting apparatus based on an intensity modulation signal; and
a projection optical system that projects the image light, the lighting apparatus including:
a light source;
a phase modulation liquid crystal panel that includes a plurality of pixels, wherein the phase modulation liquid crystal panel modulates a phase of light from the light source for each of the plurality of pixels;
a modulation signal corrector that performs signal correction that corrects a pixel modulation signal for a target pixel among the plurality of pixels based on a a pixel modulation signal for at least one peripheral pixel that is located around the target pixel to reduce a deviation amount relative to a desired amount of modulation of the target pixel; and an application voltage generator that generates an application voltage to be applied to each of the plurality of pixels based on the pixel modulation signal having been corrected by the modulation signal corrector.

9. The projector according to claim 8, further comprising an image signal circuit that generates the intensity modulation signal based on a an image pattern represented by an image signal and an illumination pattern calculated based on the image signal.

* * * * *